United States Patent [19]

Wallstén

[11] 3,930,464

[45] Jan. 6, 1976

[54] APPARATUS FOR APPLYING A COATING COMPOSITION ONTO A WEB

[75] Inventor: Hans Ivar Wallstén, Saffle, Sweden

[73] Assignee: AB Inventing, Sweden

[22] Filed: Feb. 13, 1974

[21] Appl. No.: 442,104

Related U.S. Application Data

[63] Continuation of Ser. No. 220,897, Jan. 26, 1972, abandoned.

[30] Foreign Application Priority Data

Jan. 27, 1971 Sweden.............................. 981/71
Oct. 20, 1971 Sweden............................ 13320/71

[52] U.S. Cl. ................ 118/122; 118/316; 118/411
[51] Int. Cl.² ..................... B05C 5/02; B05C 11/04
[58] Field of Search .......... 118/121, 122, 226, 227, 118/411, 414, 316, 405, 325, 103, 115, 412, 419

[56] References Cited
UNITED STATES PATENTS

| | | | |
|---|---|---|---|
| 836,336 | 11/1906 | Parker ............................ | 118/405 |
| 1,309,858 | 7/1919 | Jones............................... | 118/122 X |
| 1,676,363 | 7/1928 | Siedell et al. .................... | 118/122 X |
| 1,826,697 | 10/1931 | Charch ............................ | 118/122 X |
| 2,338,195 | 1/1944 | Mills et al............................ | 118/226 |
| 2,914,419 | 11/1959 | Oganowski...................... | 118/226 X |
| 3,405,006 | 10/1968 | Follrath ............................ | 118/224 X |
| 3,448,666 | 6/1969 | Kappelhoff et al. ............. | 118/411 X |
| 3,575,134 | 4/1971 | Quent.................................. | 118/122 |
| 3,675,621 | 7/1972 | Griffin et al. ........................ | 118/122 |

FOREIGN PATENTS OR APPLICATIONS 1,224,601 9/1966 Germany ............................ 118/122

*Primary Examiner*—John P. McIntosh
*Attorney, Agent, or Firm*—Ostrolenk, Faber, Gerb & Soffen

[57] ABSTRACT

A method and apparatus for applying a coating composition onto a web, in which the coating composition is subjected to a first general smoothing during the passage of the web between relatively stiff surfaces of a primary coating member and the final smoothing of the coating is effected in a nip formed between relatively flexible flat surfaces of a secondary coating member. Said coating members being spaced from each other in the running direction of the web. The web is both stabilised and pre-coated by the primary coating member, whereas the coating is finalised by the secondary coating member.

15 Claims, 8 Drawing Figures

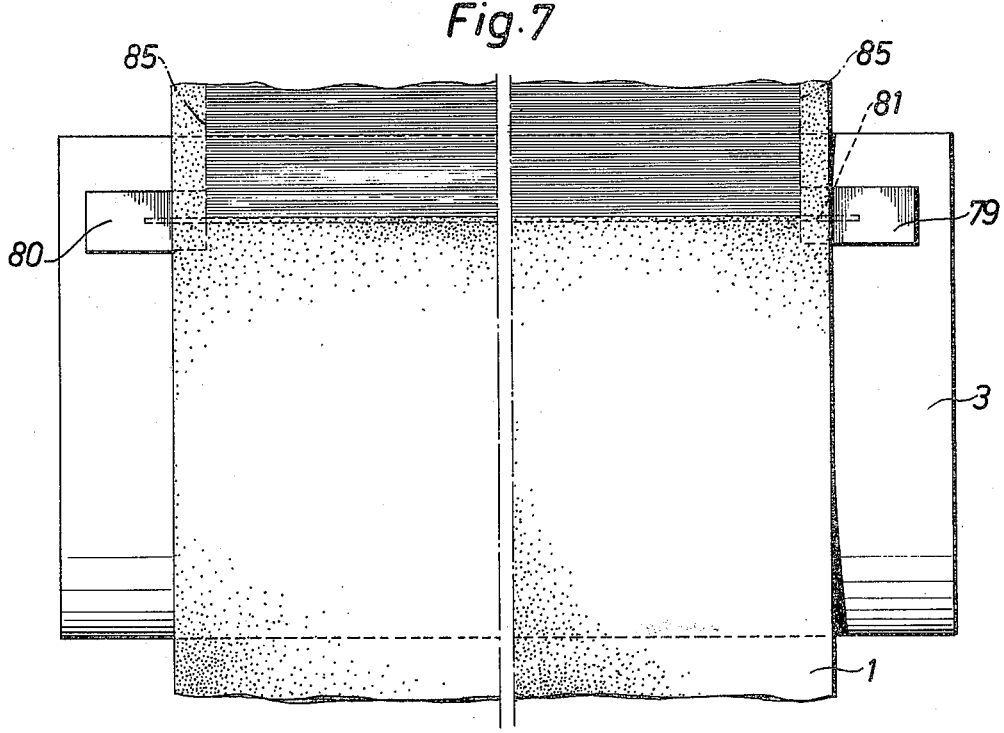
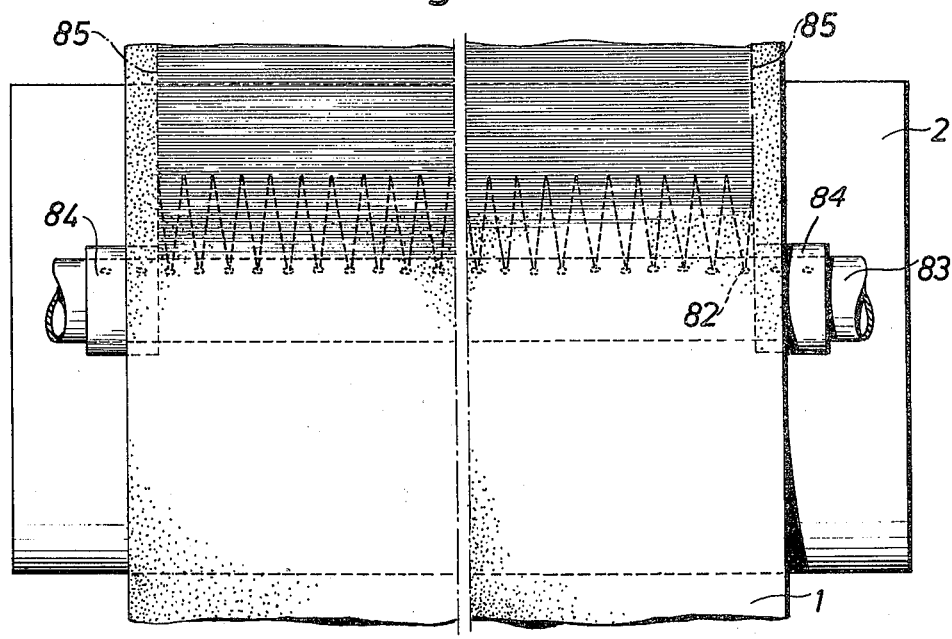

APPARATUS FOR APPLYING A COATING COMPOSITION ONTO A WEB

This is a continuation of application Ser. No. 220,897 filed Jan. 26, 1972, now abandoned.

The present invention relates to a means for applying a coating composition onto a web by means of at least two coating members spaced from each other in the direction of movement of the web, i.e. a primary coating member and a secondary coating member each having two flat surfaces, the web being moved substantially from below and upwards and hereby, prior to or in connection with the passage of the primary coating member, being coated at least on one side with an excess of a coating composition.

It is already known that smoothing out the coating composition when coating paper, for example, with flexible steel blades gives a satisfactory result. Nowadays there exist a considerable number of so-called blade coating methods and these are usually characterised by the flexible steel blade smoothing out the coating composition over the paper web in such a way that the web is at the same time supported from the opposite side by a rotating roll, often covered with rubber. According to these methods, therefore, the paper web is coated on one side and, if the paper is required to be coated on both sides, two such coating stations are used with an intermediate drying zone in such a way that each station only coats one side of the paper web.

There are certain advantages with the use of such blade coating methods in permitting a roll or the like to apply the coating composition before the blade, this pre-coating supplying a considerable excess of coating composition, after which the blade scrapes off the excess at the same time as it spreads the coating evenly. Alternatively, the coating composition may be supplied directly to the nip formed between the paper web and the blade.

It is also known to place two blades at acute angles to each other one of each side of a paper web in such a way that the blade edges meet each other and can effect simultaneous blade action on both sides of the paper web if the coating composition is supplied in the nip between the paper web and respective blade edge. However, such a method is in practice not very suitable, partly because the flexible blades cannot be made to assume a stable position in relation to each other. This is mainly because the blade coating method is best suited to be used with very thin steel blades, usually having a thickness of 0.3 – 0.5 mm.

According to an another known solution of the present problem a coating composition is applied on both sides of a paper web moving in a downward direction, by means of two flat surfaces arranged symmetrically against the web, converging on it and having a scraping action. The distance between the edges near the web and the web itself can be adjusted so that the coating composition introduced from above in the spaces, funnel-shaped in profile, formed between the web and the flat surfaces is pressed against the edges of the web and is then smoothed out on both sides of the web by means of further flat surfaces in abutment with the web.

This known device has at least two important drawbacks, however. First of all, coarse particles of the coating composition become attached to the pointed edges of the flat surfaces abutting the web, with the result that scratches or other irregularities occur in the coating. Secondly, it is difficult to collect the excess composition scraped off and possibly return it for circulation once again. Thus, this method has not found any practical use either.

It is therefore an object of this invention to provide an apparatus for applying a layer of substantially uniform thickness to one or both sides of a moving web, thereby eliminating the above-mentioned drawbacks of previously known methods.

substantially characteristic of the apparatus proposed according to the invention is that the coating composition applied onto the web is subjected to a first general smoothing during its passage of the flat surfaces of the primary coating member and that the final smoothing of the coating on the web is effected in a nip formed bewteen the relatively flexible flat surfaces of the secondary coating member, the gap formed between the flexible flat surfaces and respective sides of the sheet of material being continuously washed with the coating composition.

The method proposed according to the invention can be used for both single and double sided coating of webs. Also, if desired, the two sides of the web may be coated with different coating compositions.

According to a suitable embodiment of the invention, the excess coating composition scraped off by the secondary flat surfaces is recirculated in the system.

An apparatus is suitably used having at least two coating assemblies arranged one after the other in the running direction of the web, i.e. a primary coating assembly and a secondary coating assembly, each having two flat surfaces and that the primary coating assembly is adjustably arranged spaced from the web and that the second coating assembly having flexible flat surfaces is arranged spaced from the first assembly in the running direction of the web.

According to a suitable embodiment of the invention said apparatus can be designed from a reliability point of view in a more complete manner. For example so that accurate adjustment and regulation of the thickness of the layer applied can be ensured and also, for instance, the necessary cleaning of the apparatus can be considerably facilitated.

The required adjustment of the flat surfaces of the coating assembly is substantially achieved by making the coating members adjustable independently of each other, the two holders for each coating member being in mechanically guided engagement with each other in order to produce synchronous movement of respective flat surfaces in relation to the web. This mechanically guided engagement is suitably achieved by the two holder pairs being in toothed engagement.

In order to achieve a further precisely adjustment during the coating operation of the distance between respectively flat surfaces, it is suitable to use fine-adjustment means on both sides of the respective coating members, the fine-adjustment means consisting of shaft pins arranged each in its own housing on respective holders, said shaft pins cooperating with each other, one of the shaft pins being fixed in its housing and the other shaft pin being axially movably journalled in its housing.

According to the invention a considerable advantage can be achieved when the apparatus is being cleaned. For this purpose collecting pans are arranged to be pushed against one another or overlapping each other at the same time as the flat surfaces are moved towards each other. This provides a closed space limited at the top by the flat surfaces of the secondary member which are in abutment with each other and at the bottom by the collecting pans. This space can be internally rinsed with suitable means without the risk of splashing other parts in the vicinity. The rinsing water can then be removed from the collecting pans.

Furthermore, by means of the design proposed according to the invention the advantage is also gained that it is very simple to protect the side edges of the web from application of coating composition. This may be extremely important, for example, if the two sides of the paper web are to be coated with different coating compositions. If the different coating compositions are sprayed onto the paper web along its entire width, some of the composition might be sprayed beyond the side edges and thus mixed with the coating composition on the other side. This is prevented according to the invention since the outlets of the supply members for the coating composition, are positioned below the flat surfaces of the primary coating member, and are provided with protecting members arranged to leave a free edge zone along the two edges of the web.

Alternatively, this may be achieved by using a paper web wider than the active coating width of the supply members so that a free edge zone is provided along the two side edges of the web.

According to the invention, the distance between the flat surfaces of the primary member and the flat surfaces of the secondary member may also be adjustable. This distance, by means of its length at a constant speed of the web, provides a certain so-called impregnation time and this time can be varied by decreasing or increasing the speed of the web, as well as by increasing or decreasing the distance between the members.

Further objects and the full scope of the invention will become apparent from the drawings and the following detailed description, in which FIG. 1 is a schematic view of a first embodiment of an apparatus according to the invention, FIG. 2 is a schematic view of another embodiment of the apparatus, FIG. 3 is a schematic view of an apparatus used within a paper or coating machine, FIG. 4 is a schematic perspective view of a further embodiment of the invention.

FIG. 7 is a section along the line A-A in FIG. 6 through a means for limiting the extent to which the coating composition is spread laterally, and FIG. 8 is a section along the line B-B in FIG. 6.

Figure 1:
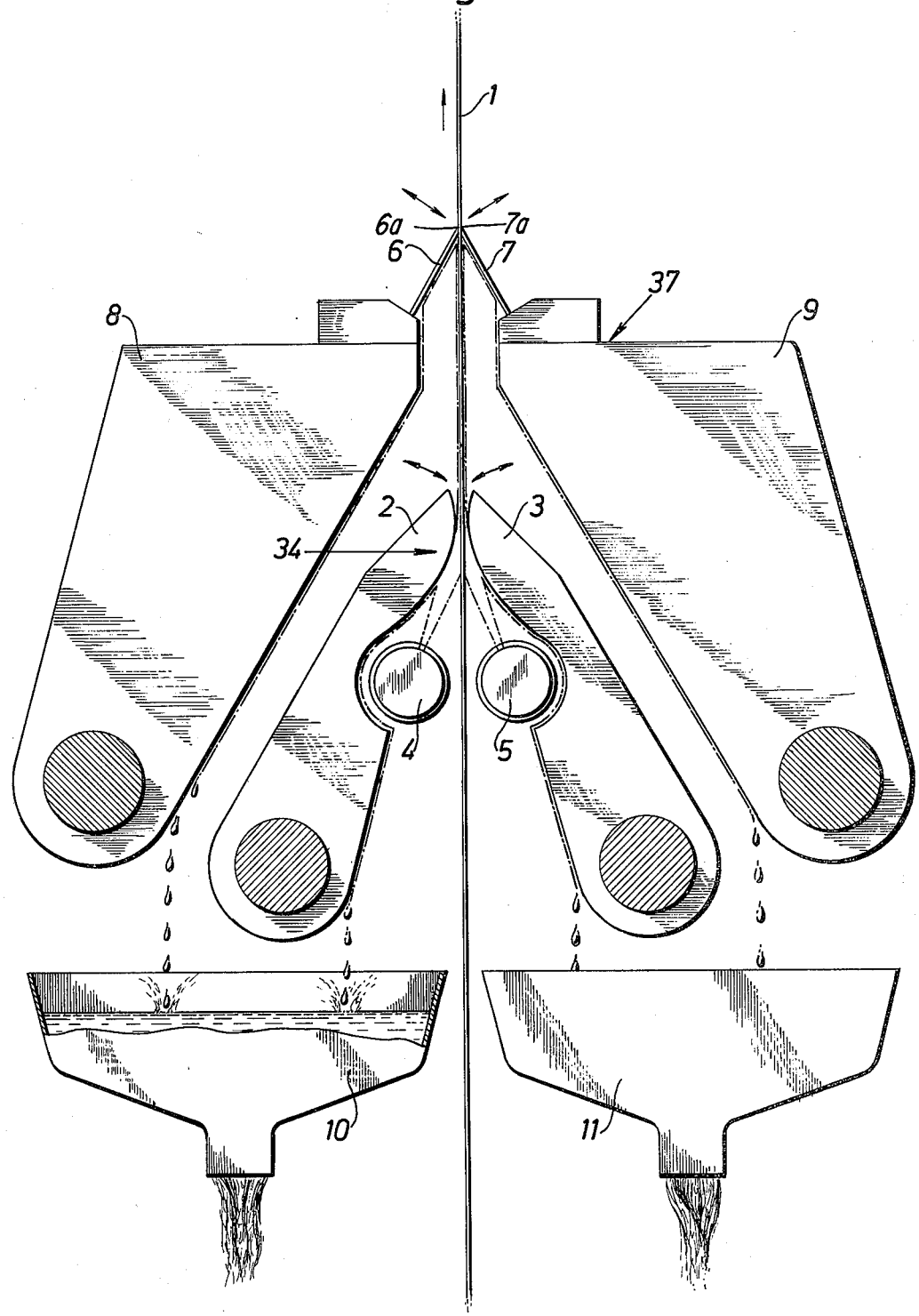
Figure 2:
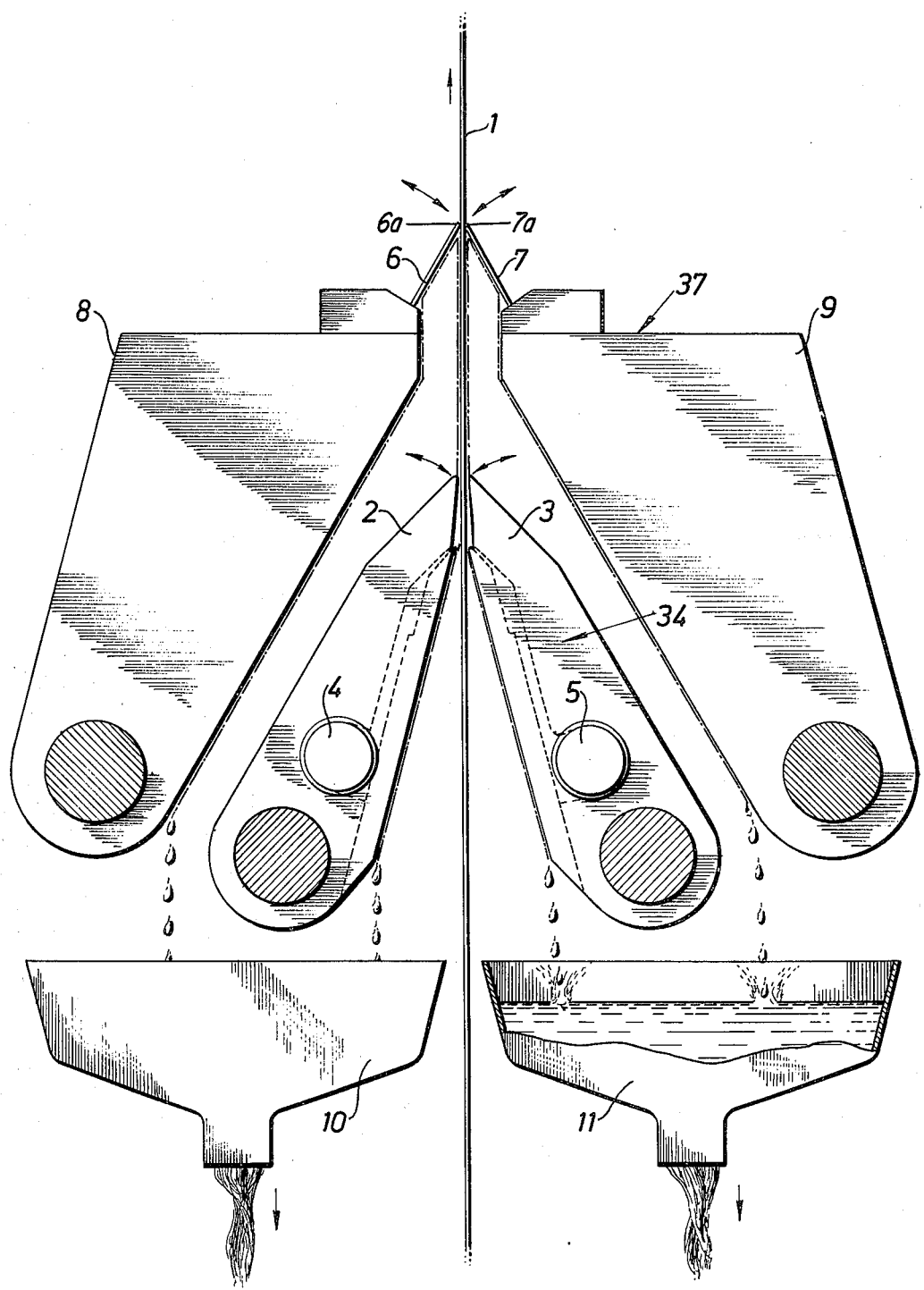

In the drawings (see FIG. 1) 1 designates a web to be coated. In the example described in the following a paper web is used, but the invention is of course not limited to the use of a paper web and may be used for webs of other types of material with the same satisfactory results. The paper web 1 is moved vertically upwards through the device and thus (according to FIGS. 1 and 2) passes a primary coating assembly 34 consisting of two flat surfaces 2, 3, one on each side of the web. Between the backward extensions of the flat surfaces 2, 3 and the respective sides of the web are arranged tubes 4, 5 to spray the sides of the paper with a coating composition. Above the primary coating assembly — seen in the running direction of the web 1 — is arranged a secondary coating assembly 37, consisting of two spreader blades 6, 7 converging on the web, which are attached in pivotable holders 8, 9, respectively. Finally, collecting pans 10, 11 are located below the apparatus, which operates as follows:

The coating composition is applied on both sides of the paper web 1 either by means of the spray pipes 4, 5 (FIG. 1) or as shown in FIG. 2 through channels arranged in the backward extensions of the flat surfaces 2, 3, these channels being connected to the pipes 4, 5. The coating composition applied on one or both sides of the web 1 is spread out and distributed over the paper web 1 by means of the adjustable, relatively stiff flat surfaces 2, 3 of the primary coating assembly 34. Immediately after passage of the flat surfaces 2, 3, therefore, the paper web 1 has a substantially uniform coating. By adjusting the distance between the flat surfaces 2, 3 a certain amount of excess coating composition is obtained on the web. When the paper web 1 afterwards passes between the nip of the flexible flat surfaces 6, 7 of the secondary coating assembly 37 the coating acquires its final uniformity and thickness. The excess coating composition scraped off then returns as indicated in the drawings and is collected in the pans 10, 11 for re-use.

The primary coating member has in principle two objects. First of all, the flat surfaces 2, 3 of said primary coating assembly stabilise the paper web 1 so that it does not flutter and thus unfavourably influence the levelling in the subsequent nip between the thin and flexible blades 6, 7 of the secondary coating assembly 37. The stabilising effect is achieved by the relatively stiff flat surfaces 2, 3 of the primary assembly 34 and by the influence of the dynamic liquid pressure of the coating composition on the paper web 1 as it is pressed between the flat surfaces 2, 3 of the primary coating assembly 34. Furthermore, as has already been mentioned, the primary coating assembly 34 has the task of pre-coating the paper web 1 with a suitable quantity of coating composition, the quantity being partly influenced by the distance between the members 2 and 3. The advantages of both the pre-coating and the stabilising of the paper web by means of the primary assembly 34 are no doubt obvious. The pre-coating permits a suitable degree of impregnation before the secondary smoothing process and since there is such an excess of coating composition at the primary coating there is no risk of particles of this composition adhering to the blade edges 6a and 7a thereby causing scratches in the coating. Instead, the space in front of the blade edges 6 and 7 is continuously rinsed, that is the space between each blade and the corresponding side of the web, which greatly reduces this risk.

As mentioned above, the flat surfaces 2, 3 of the primary coating assembly should be relatively stiff to contribute to a stabilising of the paper web 1. The distance between the surfaces 2 and 3 may of course be adjusted in various ways, either by mechanical means or with the help of spring loading, for example. Examples of this will be described below. In the latter case a balance will prevail between the dynamic liquid pressure caused by the coating composition and the spring pressure. The use of a spring-loaded adjustment on at least one of the flat surfaces offers the advantage that there is a certain yield in case there are any defects in the paper web, for example lumps, which are forced to pass the flat surfaces. This yielding reduces the risk of interruptions in operation. Another adjustment means may consist of at least one of the flat surfaces being spring-loaded, but resting against an adjustable stop so that the distance between the flat surfaces can be adjusted while retaining a certain degree of yield. Irrespective of how such yielding primary coating assembly 34 is used, it is important that the members, relatively stiff in themselves, are very solid in relation to the paper web, so that the desired stabilizing effect is achieved.

The quantity of coating composition may be regulated partly by regulating the quantity applied at the flat surfaces 2 and 3 and partly by variation of the blade pressure in the nip between the flexible flat surfaces 6 and 7. A suitable distribution of the coating quantity on each side of the web may also be set by distributing the coating composition in various ways through the pipes 4 and 5. The means may also be used for coating different compositions on each side of the paper web and, of course, the coating may be applied on only one side of the web, if disired.

Figure 3:
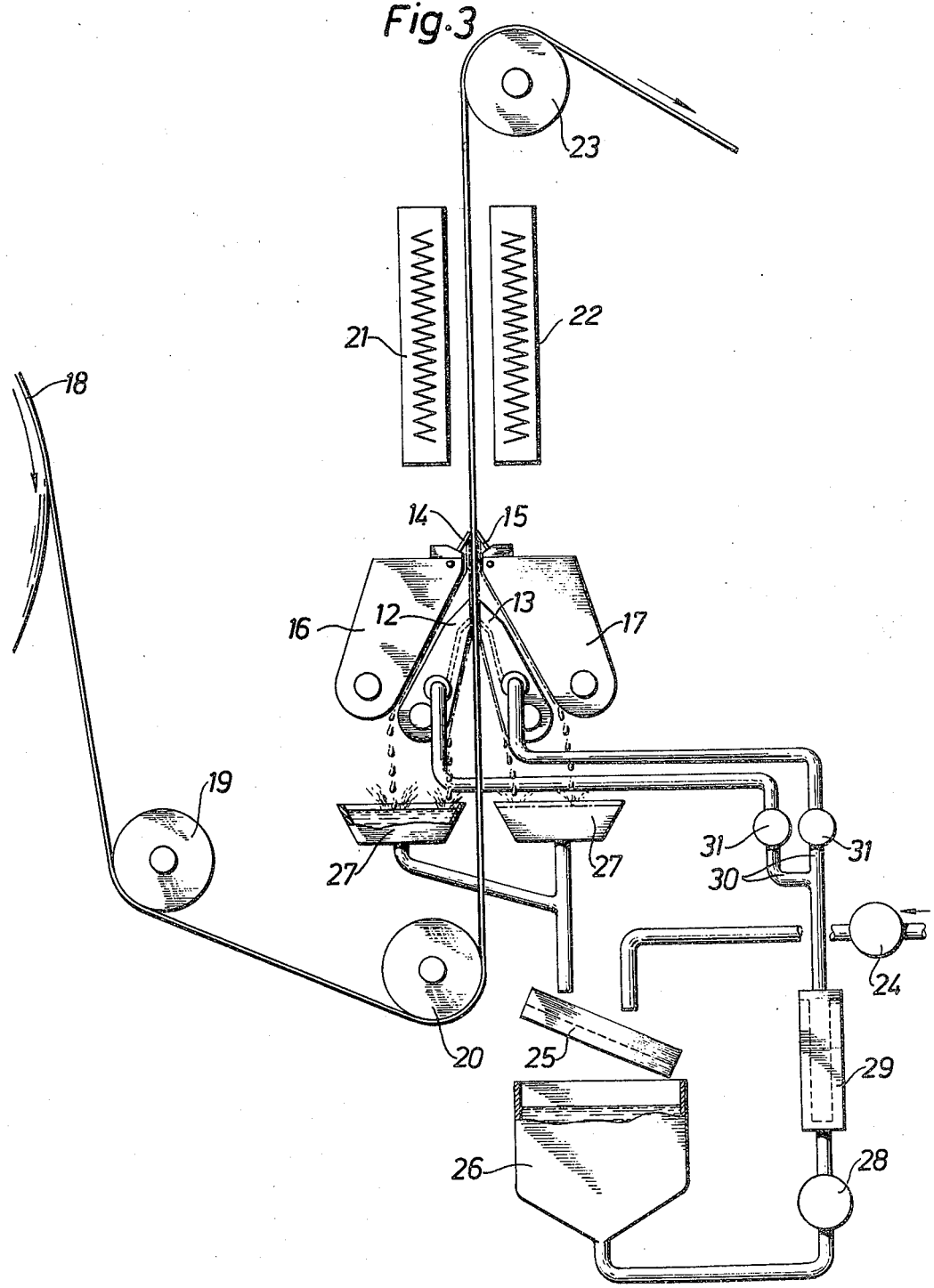

FIG. 3 shows an example of how the coating means proposed according to the invention can be arranged in a paper machine or a coating machine. The paper web 1 leaves the last cylinder 18 in the pre-dryer and is led through guide rollers 19, 20 in an upward vertical direction. The web 1 passes the actual coating means first and then continues through a primary drying means 21, 22 after which it is guided by a paper guide roller 23 into a final drying system, not shown. The coating means comprises a primary coating assembly with the flat surfaces 12, 13. Above this in the direction of movement of the web is a secondary coating member, consisting of two flexible, blade-shaped flat surfaces 14, 15 attached in pivotable holders 16, 17 respectively. Fresh coating composition, for example in the form of a water-dispersed clay with a binder, is fed by a pump 24 through a screen 25 to a collecting tank 26.

The excess coating composition from the coating means is led through collecting means 27 to the collecting tank 26. A pump 28 pumps the coating composition from the tank 26 through a suitable pressure screen 29 back to the primary coating members 12, 13. Thereby the coating composition passes through two parallel conduits 30, having valves 31, 31.

In the means shown in FIG. 3 the total quantity of coating composition circulated can be regulated by the pump 28 and/or the valves 31. The quantity of coating composition to be applied on the paper web can easily be regulated in relation to the quantity to be recirculated by blade pressure on the blades 14, 15 which can be achieved by pivoting the blade holders 16, 17. The distance between the two flat surfaces 12 and 13 can be adjusted to achieve a dynamic liquid pressure to stabilise the paper web by making these flat surfaces pivotable. If the thickness of the coating is to be different on the two sides of the paper web, this can be achieved by regulating the quantity of coating composition fed by means of the valves 31.

Figure 4:
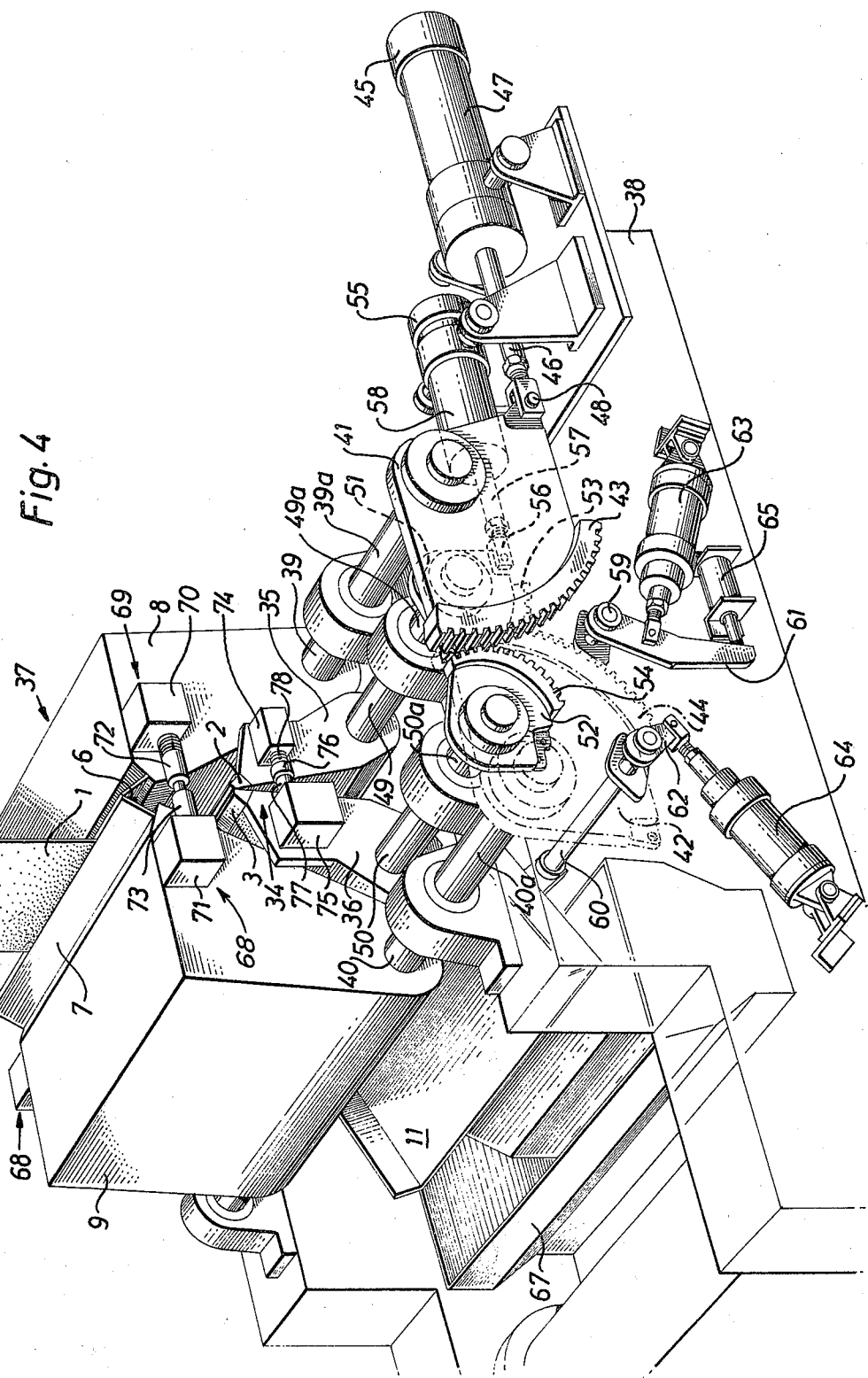
Figure 5:
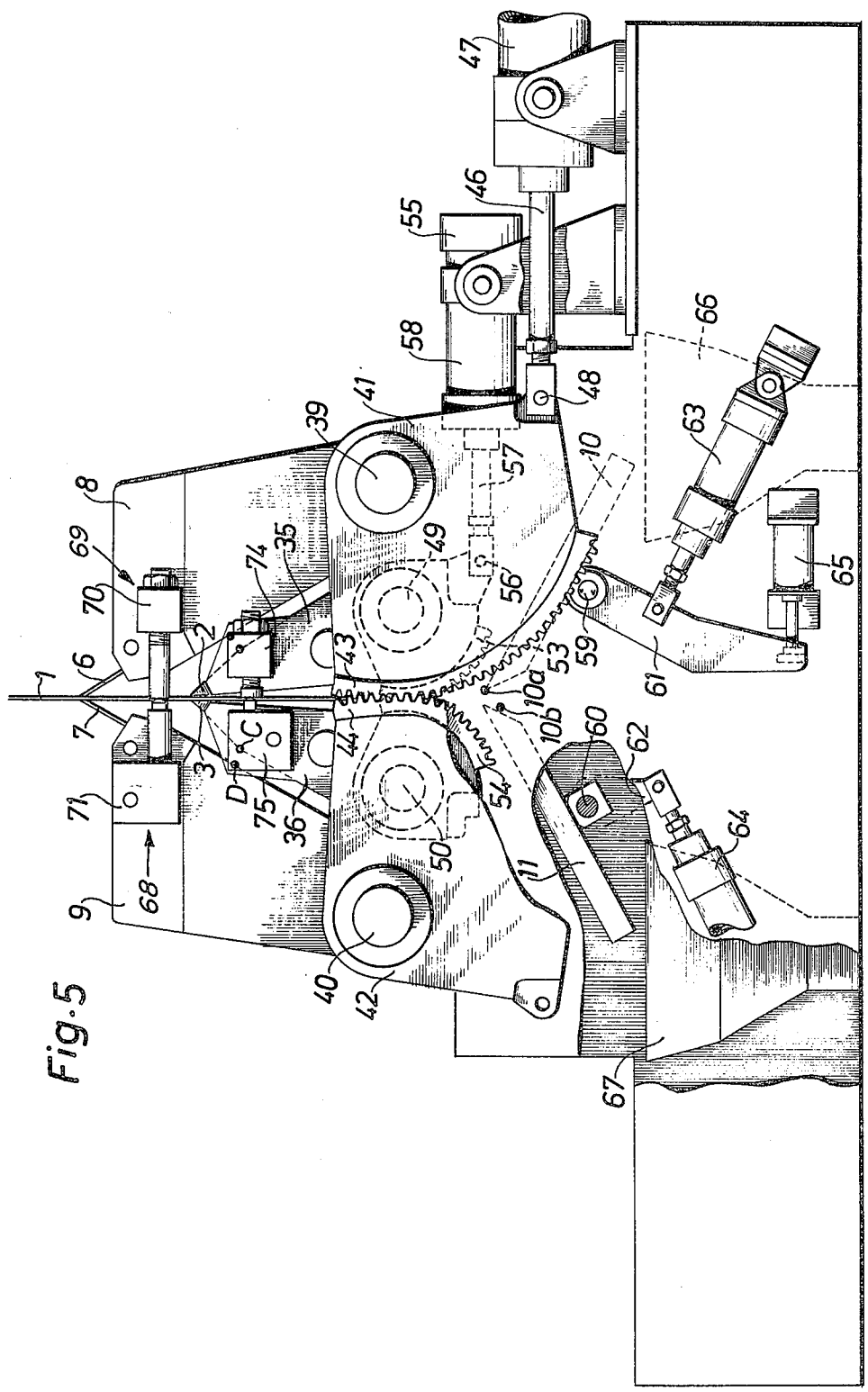
FIG. 5 is a side view of the apparatus shown in FIG. 4.

In the embodiment shown in FIGS. 4 and 5 there is also a secondary coating assembly 37 above the coating assembly 34, this secondary coating assembly comprising two flexible flat surfaces, for example two coating blades 6, 7 which are attached to pivotably journalled holders 8 and 9, respectively. Collecting pans 10, 11 are arranged under the means itself to collect the coating compound for re-use.

The holders 8 and 9 are fixed on pivotably journalled shafts 39 and 40, respectively, on the stand 38, one end, 39a and 40a, respectively, of these shafts projecting out of the stand and being fixed to curved segments 41, 42, respectively, the parts of these facing each other being in engagement with each other by means of toothed segments 43, 44. A member 45 for transmitting motion is fixed to the curved segment 41, this being in the form of a piston rod 46 pivotably journalled about a pin 48 and joined to a piston, displaceable in a cylinder 47. The cylinder 47 may comprise a hydraulic cylinder or it may be activated pneumatically. Alternatively the member 45 for transmitting movement may consist of a toothed rack or the like.

In the same way the holders 35, 36 for the flat surfaces 2, 3 of the primary coating assembly 34 are fixed to shafts 49, 50 pivotably journalled on the stand 38, the ends 49a, 50a projecting from the stand carrying curved segments 51, 52 located opposite each other, which via toothed segments 53, 54 are in meshing engagement with each other. A member 55 for transmitting motion is fixed to the curved segment 51, this being in the form of a piston rod 57 pivotably journalled about a pin 56 and joined to a piston displaceable in a cylinder 58. This movement-transmitting mechanism can be constructed in the same manner as described above for the movement-transmitting mechanism 45 intended for the holders 8, 9.

The collecting pans 10, 11 are pivotably journalled about individual shafts 59, 60, the pivoting movement being achieved via movement-transmitting members in the form of hydraulic cylinders 63, 64 acting on an intermediate piece connected to the shafts 59, 60. Instead of these hydraulic cylinders it is also possible to use pneumatically operated cylinders or other movement-transmitting members in the form of toothed racks or the like. In order to produce a certain movement of the front edge 10a of the collecting pan 10 to a position indicated by point 10b which, as will be explained in further detail below, is practical for cleaning the apparatus, there is an additional movement-transmitting mechanism 65 which deals with the lower part of the intermediate piece 61. The reflux of coating compound collected in the collecting pans 10, 11 runs down into larger storage tanks 66, 67.

In order to precisely adjust the distance between the blades 6, 7 of the secondary member, fine-adjustment members 69, 68 are provided, respectively consisting of shaft pins 72, 73, each arranged in its own housing 70, 71 on respective holders 8, 9, one shaft pin 73 being fixed in its housing and the other shaft pin 72 being axially movably journalled in the housing 70 so that it can be adjusted manually, for example, projecting a predetermined length from the housing. It is suitable to arrange a fine-adjustment member on each side of the holders 8, 9.

Corresponding fine-adjustment members, only one of which is shown in FIGS. 4 and 5, however, are provided to precisely determine the distance between the flat surfaces 2, 3 of the primary member. These fine-adjustment members thus also consist of shaft pins 76, 77 co-operating with each other and each arranged in its own housing 74, 75, one of the shaft pins, 77, being fixed in its housing 75 while the other shaft pin 76 is axially movably journalled in its housing 74, for example by means of an external thread 78 which cooperates with a corresponding internal thread in the housing 74.

To clean the whole device, the holders 35, 36 of the primary coating assembly 34 can be parted from their coating position shown in FIG. 4 to an open position (for example to a completely open position, i.e. from point C to point D). An opening is thus obtained in the device, through which cleansing liquid can be sprayed, for example. At the same time the flat surfaces 6, 7 of the secondary member remain in contact with each other and the front point 10a of the collecting pan 10 is moved to the point 10b (see FIG. 5) so that the gap between the pans 10 and 11, through which the web passes during the coating process, is eliminated. In this way, the upper part of the device is closed off and the pans 10, 11 completely cover the lower part of the device so that the cleansing liquid is continuously collected in the pans 10, 11, without spilling, for further transport to the tanks 66, 67. By means of the toothed engagement between the curved segments 51, 52 cooperating with the holders 35, 36 of the coating assembly 34, shown in FIGS. 4 and 5, a mechanically guided synchronous movement of the flat surfaces 2, 3 in relation to each other is achieved, which is important for the adjustment of the distance between the flat surfaces. This distance can then be still more precisely adjusted by means of the fine-adjustment members (only one of which is shown for the primary coating member) at the sides of the holders 35, 36.

The same adjustment possibility and synchronous movement of the flat surfaces 6, 7 of the secondary coating member 37 is achieved by means of the toothed engagement between the toothed segments 41, 42 and fine-adjustment members 68, 69.

Figure 6:
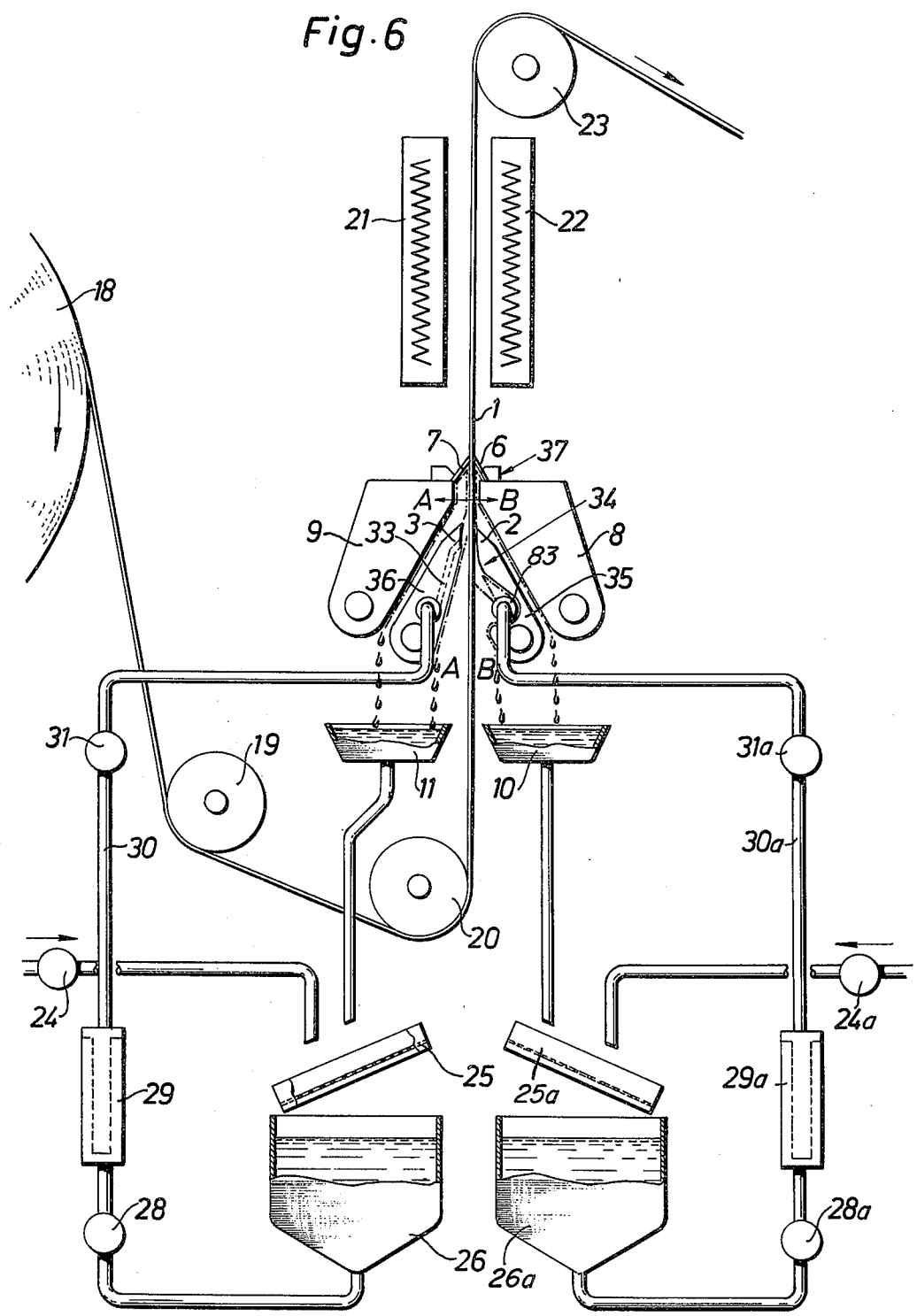
FIG. 6 is a principle view of another embodiment for use in two-sided coating with different coating compositions on each side.

FIG. 6 shows a means for two-sided coating of a paper web with different coating compositions on respective sides of the web. Here the supply members for the compositions are designed so that a free edge zone is obtained at both sides of the web material. The paper web 1 which, for example, leaves the last cylinder 18 in a pre-dryer, is led over guide rolls 19, 20 in an upward, vertical direction. The web 1 then passes through the coating apparatus and then continues through a primary drying means 21, 22, after which it is guided by a paper guide roll 23 into a final drying system, not shown. The coating means comprises a primary coating assembly 34 having flat surfaces 2, 3. Above this - seen in the running direction of the web 13 is the secondary coating assembly 37 with its flat surfaces 6, 7.

If the two sides of the web 1 have been coated with two different coating compositions, two separate supply and collecting systems must be used, i.e. a system serving the side of the paper web 1 facing the holder 35 and a corresponding system serving the side of the paper web facing the holder 36.

The fresh coating composition is fed into each of these systems by means of pumps 24 and 24a, through screens 25 and 25a to storage tanks 26 and 26a and from there through pipes 30 and 30a each provided with pumps 28 and 28a, subsequent pressure screens 29 and 29a and valves 31 and 31a, to supply members 32, 33 arranged close to the respective holders 35, 36. The supply member 32 located in the holder 35 consists of a spray pipe 83 provided with jet outlets 82 facing the paper web 1 (see FIG. 8), whereas the supply member 33 located in the holder 36 opens out in a slot opening 81 facing the paper web 1 (see FIG. 7). The return flow of respective coating compositions is collected in respective pans 10 and 11 and returned from these pans through the screens 25 and 25a and then to their respective storage tanks 26 and 26a.

FIGS. 7 and 8 show different designs of the means for limiting the spread of the coating composition laterally, which is of particular importance when coating media of different compositions are applied on the two sides of the web.

In FIG. 7, the slot opening for the supply of coating composition in the flat surface 3 is indicated by broken lines 81. The length of the slot opening 81 has been limited by a protecting device consisting of two covering plates 79, 80 laterally displaceable, which are arranged to be displaced towards the centre of the paper web 1 to cover the slot opening 81 as predetermined.

FIG. 8 shows an alternative embodiment of such a covering means where the coating composition is supplied through spray tubes 83 provided with outlets 82 facing the paper web 1 and opening out below the flat surface 2 of the primary member 34. The required covering at the sides can then be achieved by means of sleeves 84 displaceably journalled on the ends of the spray tubes 83 so that the coating of the paper web 1 laterally can be limited along the line 85.

In the examples shown in the drawings, the primary coating member has flat surfaces which substantially converge on the web. However, this is only one suitable embodiment and many other embodiments are also feasible, for example any angle from the position converging in the running direction of the web as shown here to positions converging in the opposite direction.

I claim:

1. Apparatus for applying a coating composition to a paper web comprising:
    means for guiding the web to move in an upward direction through the coating apparatus which includes:
    a first pair of rigid, elongated, upwardly converging opposed members positioned on opposite sides of the upwardly moving web, and each having stationary contact surfaces;
    means connected to said first pair of members for adjusting the coating contact surfaces of each of said first pair of members in adjustably spaced fashion, said first members converging upwardly and inwardly from said adjusting means towards said web whereby their contact surfaces form predetermined gaps each being defined by the surfaces of said web and the adjacent contact surfaces of said members, said gaps, once adjusted, being maintained in substantially constant alignment throughout a coating operation;
    coating dispensing means positioned adjacent to said gaps and being spaced from the web for continuously directing a quantity of the coating composition in liquid form toward the surfaces of said web as the web moves upwardly and before the web leaves the gap region between the contact surfaces of said first members;
    the width of said gaps being selected to uniformly spread an excess amount of the coating composition upon the surface of the web, said members cooperating with the coating composition, as the web passes between said members, to substantially reduce lateral movement of and thereby stabilize the web during the smoothing operation; and
    upwardly converging flexible means positioned adjacent and above said opposed members and forming a nip engaging the opposite surfaces of the web for removing the excess coating composition from said web and uniformly regulating the final thickness of the coating.

2. The apparatus of claim 1 wherein said flexible means comprises a pair of upwardly converging flexible members having their adjacent edges arranged to form a nip through which said web passes;
   means for urging said flexible members toward one another to control the amount of excess coating composition to be removed from said web by the secondary smoothing means.

3. The apparatus of claim 2 wherein the spacing between said gaps and said nip are adjusted to control the amount of coating composition which impregnates the web.

4. The apparatus of claim 2 wherein said flexible members are flexible blades arranged in upwardly converging alignment by pivotally mounted holders and having substantially straight free edges opposing one another to form said nip.

5. The apparatus of claim 4 further comprising means for moving the pivotally mounted holders in unison to effect simultaneous adjustment of the positioning of said free edges.

6. The apparatus of claim 1 wherein said coating dispensing means comprises means for spraying the coating composition upon said web as the web is passing said members.

7. The apparatus of claim 6 wherein said spraying means is positioned between said pair of members and immediately below said gaps.

8. The apparatus of claim 1 wherein said primary members are rigid and the gaps formed between the members and the web are adjusted to provide an excess of the coating composition uniformly distributed over the web so as to provide a rinsing effect upon the flexible means whereby the coating composition is carried upwardly with the web and excess coating removed in said nip is moved downwardly along the surface of the flexible means which engages the side of the web being coated to rinse and hence cleanse the flexible means of any solid matter contained in the coating composition.

9. The apparatus of claim 8 further comprising collection means positioned beneath said members and said flexible means for collecting excess coating composition removed from said web;
   said flexible means including means for directing the excess coating composition removed by said flexible means toward said collection means.

10. The apparatus of claim 9 further comprising means for supplying fresh coating composition to said coating dispensing means;
   means for directing excess coating composition collected by said collection means into said supply means.

11. The apparatus of claim 1 wherein said coating dispensing means comprises first and second coating depositing means positioned on opposite sides of said web for directing different coating compositions on opposing sides of said web.

12. The apparatus of claim 11 wherein said first and second coating depositing means each comprises means for preventing the coating composition from being deposited along the marginal edges of the web.

13. The apparatus of claim 1 further comprising means for pivotally mounting said first pair of members;
   means for moving said first pair of members in unison about their pivots to adjust said gaps.

14. The apparatus of claim 1 wherein at least one of said rigid members is provided with an internal supply means coupled to said coating dispensing means, said coating dispensing means including a slot positioned adjacent to one of said gaps for directing coating composition upon said web as it enters said one gap.

15. Apparatus for applying a coating composition to a paper web comprising:
   means for guiding the web to move in an upward direction through the coating apparatus which includes:
   a first pair of rigid elongated upwardly converging opposed members positioned on opposite sides of the upwardly moving web and each having a stationary contact surface;
   means for adjusting the coating contact surfaces of said first pair of members, which extend upwardly and inwardly from said adjusting means, in adjustably spaced fashion to form predetermined gaps each being defined by the surfaces of said web and the adjacent contact surfaces of said members, said gaps, once adjusted, being maintained in substantially constant alignment throughout a coating operation;
   coating dispensing means for continuously directing a controlled quantity of the coating composition in liquid form toward the surfaces of said web as the web enters the gap region between said members and before the web leaves the region between the contact surfaces;
   the width of each gap being selected to uniformly spread an excess amount of the coating composition upon the surfaces of the web to create a dynamic liquid pressure of the coating composition in order to substantially reduce lateral movement of the web and thereby stabilize the web to prevent fluttering during the coating operation; and
   secondary coating means comprising a pair of upwardly converging thin flexible members having their adjacent edges arranged to form a nip through which said web passes for removing the excess coating composition from said web and thereby uniformly regulating the final thickness of the coating.

* * * * *